United States Patent
Edirisooriya et al.

(10) Patent No.: US 7,290,093 B2
(45) Date of Patent: Oct. 30, 2007

(54) CACHE MEMORY TO SUPPORT A PROCESSOR'S POWER MODE OF OPERATION

(75) Inventors: Samantha J. Edirisooriya, Tempe, AZ (US); Sujat Jamil, Chandler, AZ (US); David E. Miner, Chandler, AZ (US); R. Frank O'Bleness, Tempe, AZ (US); Steven J. Tu, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/338,207

(22) Filed: Jan. 7, 2003

(65) Prior Publication Data

US 2004/0133746 A1    Jul. 8, 2004

(51) Int. Cl.
*G06F 12/12* (2006.01)
*G06F 13/00* (2006.01)

(52) U.S. Cl. .................. 711/133; 711/100; 711/144

(58) Field of Classification Search ................ 711/144, 711/145, 128, 133–135, 100
See application file for complete search history.

(56) References Cited

U.S. PATENT DOCUMENTS

| | | | | |
|---|---|---|---|---|
| 4,763,250 A | * | 8/1988 | Keshlear et al. ............ | 711/208 |
| 5,325,509 A | * | 6/1994 | Lautzenheiser ............. | 711/137 |
| 5,369,748 A | * | 11/1994 | McFarland et al. ......... | 710/309 |
| 5,414,820 A | * | 5/1995 | McFarland et al. ......... | 710/307 |
| 5,751,996 A | * | 5/1998 | Glew et al. ................. | 711/145 |
| 6,061,362 A | | 5/2000 | Muller et al. | |
| 6,075,392 A | | 6/2000 | Sander | |
| 6,078,992 A | * | 6/2000 | Hum .......................... | 711/122 |
| 6,092,159 A | * | 7/2000 | Ekner et al. ................ | 711/152 |
| 6,286,082 B1 | * | 9/2001 | Moudgal et al. ............ | 711/143 |
| 6,490,655 B1 | * | 12/2002 | Kershaw .................... | 711/133 |
| 6,643,737 B1 | * | 11/2003 | Ono ........................... | 711/128 |
| RE38,514 E | * | 5/2004 | James et al. ................ | 711/163 |
| 2001/0023460 A1 | | 9/2001 | Boucher et al. | |
| 2004/0111566 A1 | * | 6/2004 | Edirisooriya et al. ....... | 711/146 |

OTHER PUBLICATIONS

EZ Chip Technologies, White Paper, "Netowrk Processor Designs for Next-Generation Networking Equipment", Dec. 1999, 4 pages.
Altera, White Paper, "Increasing System Bandwidth with CDS", Jun. 2001, ver. 1.0, Application Note 162, 10 pages.
Second Office Action (and English translation) from Chinese Application No. 200310115494.X mailed Nov. 17, 2006, 13 pgs.

* cited by examiner

*Primary Examiner*—Tuan V. Thai
(74) *Attorney, Agent, or Firm*—Blakely, Sokoloff, Taylor & Zafman LLP

(57) ABSTRACT

A system, method, and apparatus for a cache memory to support a low power mode of operation.

7 Claims, 4 Drawing Sheets

CACHE MEMORY TO SUPPORT A PROCESSOR'S POWER MODE OF OPERATION

BACKGROUND

1. Field

This disclosure generally relates to cache memory, such as, a cache memory to support a low power mode of operation.

2. Background Information

As is well known, a cache or cache memory stores information, such as for a computer or computing system. The performance of a cache tends to decrease data retrieval times for a processor. The main memory forwards specific subsets of data to be stored into the cache memory. A few examples of data include instructions and addresses. Typically, at least one cache line within the cache memory is updated with new data, commonly referred to as a "dirty line or modified". In contrast, a clean line of a cache has data that has not changed with respect to main memory. Eventually, the new data for the dirty line or lines is written back into main memory to insure coherency between the cache memory and main memory.

Cache memories have a range of different architectures with respect to addresses locations mapped to predetermined cache locations. For example, cache memories may be direct mapped or fully associative. Alternatively, another cache memory is a set associative cache, which is a compromise between a direct mapped cache and fully associative cache. In a direct mapped cache, there is one address location in each set. Conversely, a fully associative cache that is N-way associative has a total number of N blocks in the cache. Finally, a set associative cache, commonly referred to as N-way set associative, divides the cache into a plurality of N ways wherein each address is searched associatively for a tag address.

The demand for more powerful computers and communication products has resulted in faster processors that often have higher die temperatures and consume increasing amounts of power. However, design engineers struggle with reducing power consumption and die temperature. For example, a cache needs to insure synchronization of data with main memory and to support a processor's low power mode of operation, such as, an idle state to utilize a low level of power. However, every way of a typical cache memory needs to receive power until the dirty lines have been written back to main memory. A flush operation initiates writing the dirty lines back to the main memory. Thus, every way of a typical cache memory needs to receive power until a flush operation has completed. Therefore, a typical cache memory cannot support a processor that is idle for an intermittent time during a low power mode of operation. Furthermore, a typical cache memory can support a processor that is idle for an extended amount of time only after completion of a flush operation.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

An area of current technological development relates to achieving longer battery life for communication products and computer or computing systems by reducing power consumption. Presently, a flush operation needs to be completed in order for a cache memory to support a processor's low power mode of operation for an extended period of time. Likewise, every way of a cache memory needs to receive power until the completion of a flush operation. However, as previously discussed, a cache memory cannot support a processor that is idle for an intermittent time during a low power mode of operation until the flush operation is completed because every way needs to receive power.

In contrast, an apparatus, system, and method that stores dirty lines within predetermined ways allows a cache memory to support a processor's low power mode of operation. For example, a cache memory with eight ways, way 0-way 7, may allow only ways 0 and 1 to store dirty lines. Therefore, ways 2-7 may be powered down during a processor's low power mode of operation without completion of a flush operation. Furthermore, ways 0 and 1 may be powered down after performing a flush operation on ways 0 and 1. Thus, the claimed subject matter reduces power consumption by powering down ways that do not store dirty lines. Likewise, the claimed subject matter improves cache performance because a flush operation is only performed for the predetermined ways that store dirty lines and results in reducing power consumption for the flush operation of the entire cache. . In contrast, the typical cache memory performs a flush operation for all ways.

Figure 1:
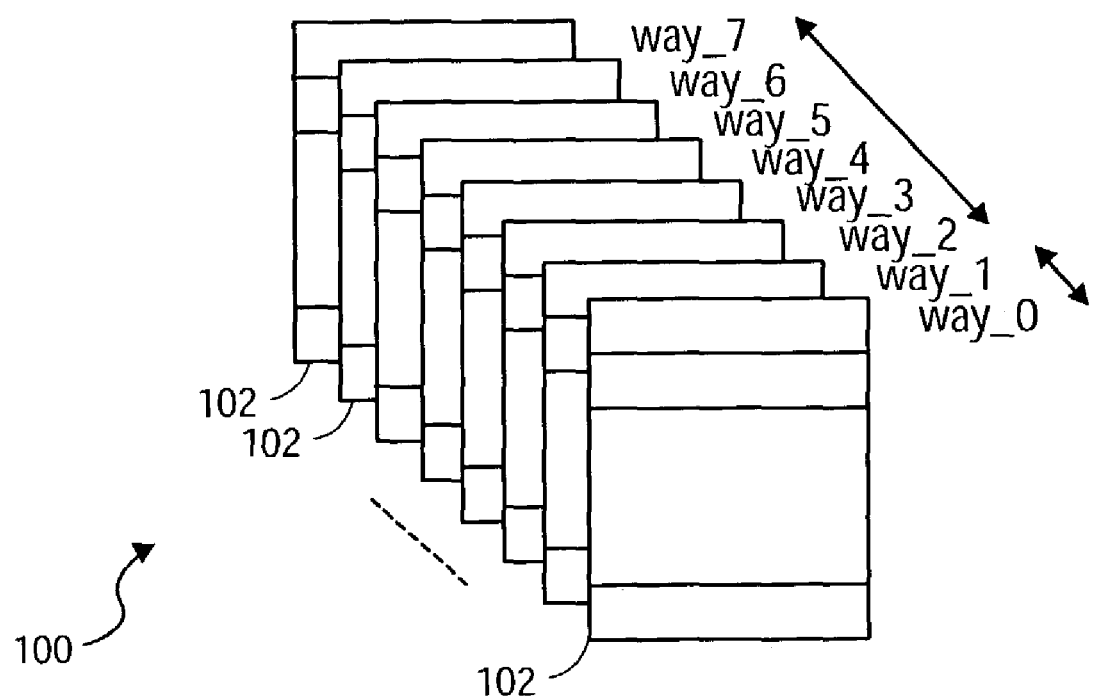
FIG. 1 is a schematic diagram illustrating an embodiment of a cache memory in accordance with the claimed subject matter.

FIG. 1 is a schematic diagram illustrating an embodiment of a cache memory in accordance with the claimed subject matter. The schematic diagram 100 comprises, but is not limited to, a cache memory with a plurality of ways. In one embodiment, the cache memory is an eight way set associative cache. However, the claimed subject matter is not limited to an eight way set associative cache. For example, the claimed subject matter supports different configurations of a cache that include a sixteen way set associate cache or a fully associative cache or any cache memory with a plurality of ways.

In one aspect, the schematic diagram facilitates a cache memory to support a processor's low power mode of operation by storing dirty lines in predetermined ways. For example, in one embodiment, ways 0 and 1 are predetermined to allow storage of dirty lines. In contrast, ways 2-7 are not allowed to store dirty lines and store clean lines.

Furthermore, ways 0 and 1 are allowed to store clean lines. However, the claimed subject matter is not limited to the embodiment of allowing only ways 0 and 1 to store dirty lines. For example, one way or more than two ways may be allowed to store dirty lines.

In contrast, in an alternative embodiment, ways 0 and 1 are predetermined to allow storage of dirty lines. In contrast, ways 2-7 are not allowed to store dirty lines and store clean lines. Furthermore, ways 0 and 1 are not allowed to store clean lines.

The schematic 100 supports various cache replacement protocols, such as, random, least recently used (LRU), pseudo-LRU, not recently used (NRU), random, and round-robin protocols.

The schematic 100 supports various cache state protocols, such as, Modified Exclusive Shared Invalid (MESI), and Modified Owned Exclusive Shared Invalid (MOESI). The MESI and MOESI protocols are well known in the art. Furthermore, the MESI protocol allows for one processor to have a cache line with data that is different from main memory. In contrast, the MOESI protocol allows two or more processors to have a cache line that is different from main memory because one processor operates the cache line in an "owned" state and the other processor has the same cache line in a "shared" state. The processor with the cache line in the "owned" state is responsible for writing the line back to main memory in order to update the main memory.

The schematic diagram supports various read and write operations, such as load and store requests, from a processor, which is discussed in connection with FIGS. 2 and 3. The claimed subject matter supports read and write operations from various agents, such as, micro-controllers, microprocessors, and chipsets.

Therefore, the claimed subject matter depicted in FIG. 1 illustrates selecting at least one way to allow for storage of dirty lines and preventing the remaining way or ways from storing dirty lines. As previously described, the claimed subject matter improves the cache performance because the flush operation is performed on a subset of the plurality of ways that are prevented from storing dirty lines. In contrast, the prior art cache performs a flush operation for all of the plurality of ways. Furthermore, the claimed subject matter reduces power consumption because the ways that are prevented from storing dirty lines may be powered down for a variety of conditions, such as, to support a processor's low power mode of operation or an external request to power down the ways.

Figure 2:
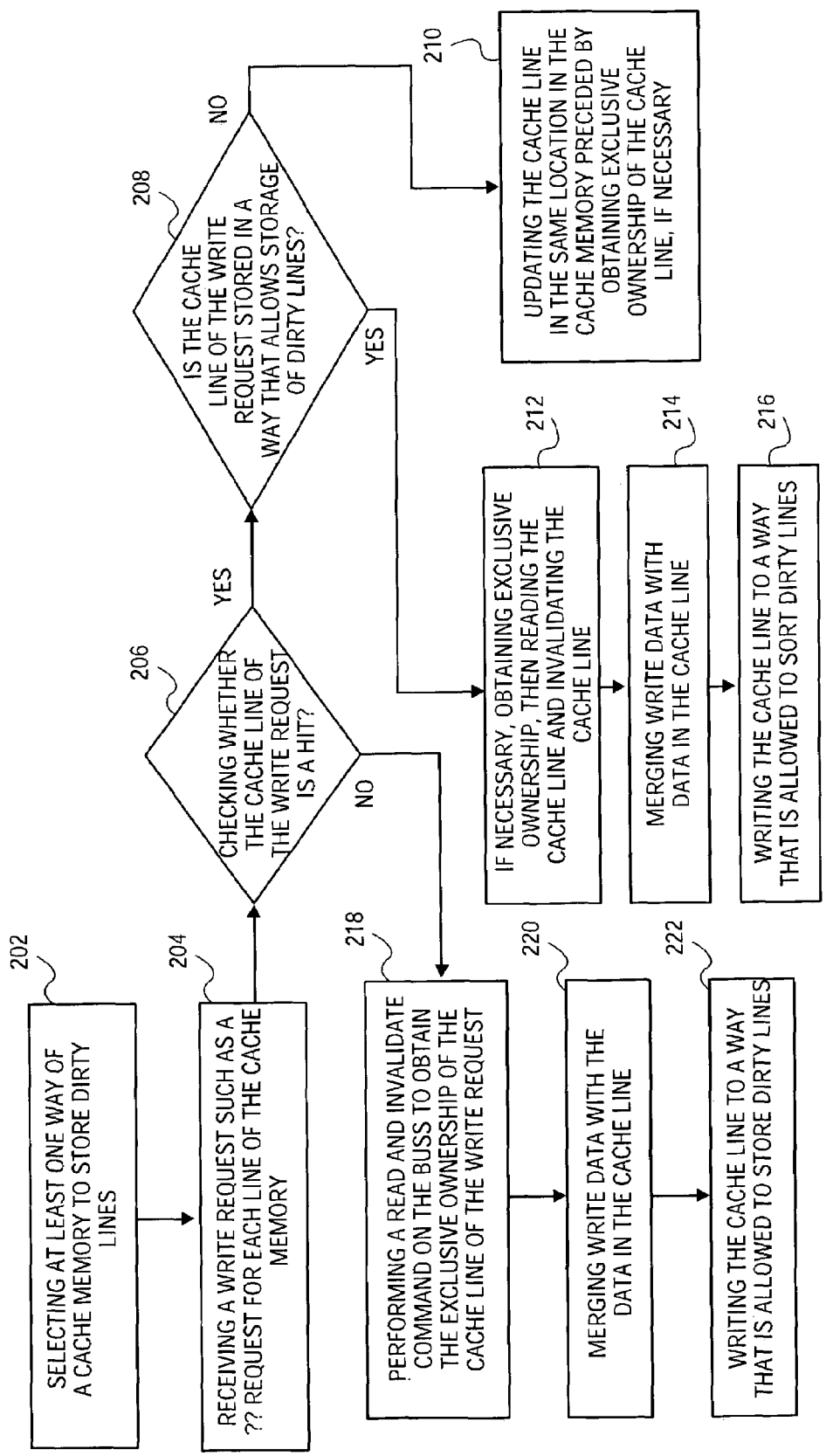
FIG. 2 is a flowchart illustrating an embodiment of a method in accordance with the claimed subject matter.

FIG. 2 is a flowchart illustrating an embodiment of a method in accordance with the claimed subject matter. The flowchart comprises, but is not limited to, a plurality of diamonds and blocks 202, 204, 206, 208, 210, 212, 214, 216, 218, 220, and 222. In one embodiment, the claimed subject matter depicts facilitating a cache memory to support a processor's low power mode of operation by storing dirty lines in predetermined ways. In another aspect, the claimed subject matter allows for powering down of the ways that do not store dirty lines to support a processor's low power mode of operation. In yet another aspect, the claimed subject matter supports a write request from a processor to allow storage of dirty lines in predetermined ways.

In one embodiment, the claimed subject matter selects at least one way of a cache memory to store dirty lines, as illustrated by the block 202. The cache memory receives a write request, such as, a store request for a cache line of the cache memory, as illustrated by the block 204.

Subsequently, a decision to determine whether the cache line of the write request is present in the cache memory and is in a valid state, commonly referred to as a hit condition, is executed by the diamond 206. If so, a decision to determine whether the cache line of the write request is stored in a way that allows for storage of dirty lines is executed by diamond 208. However, a read and invalidate command is executed, applies otherwise, as illustrated by block 218 which will be discussed on the next page.

If the cache line of the write request is stored in a way that allows for storage of dirty lines, as determined by diamond 208, the claimed subject matter proceeds to updating the cache line in the same location in the cache memory, as illustrated by block 210. In one embodiment, obtaining exclusive ownership of the cache line is performed to insure that only one processor has a copy of the cache line prior to updating the cache line in order to support the MESI and MOESI protocols.

If the cache line of the write request is stored in a way that does not allow for storage of dirty lines, as determined by diamond 208, the claimed subject matter proceeds to reading the cache line and invalidating the cache line of the write request, as illustrated by block 212. In one embodiment, obtaining exclusive ownership of the cache line is performed to insure that only one processor has a copy of the cache line prior to reading and invalidating the cache line in order to support the MESI and MOESI protocols. Subsequently, the claimed subject matter merges the write data with the data in the cache line of the write request, as illustrated by block 214. For example, in one embodiment, the merging of the write data with the data in the cache line allows for updating only the bytes in the cache line that need to be modified. Then, writing the cache line of the write request to a way that allows for storage of dirty lines, as illustrated by block 216.

In the absence of a hit condition as determined by diamond 206, the claimed subject matter performs a read and invalidate command on a bus to obtain the exclusive ownership of the cache line of the read request, as illustrated by block 218. Subsequently, the claimed subject matter merges the write data with the data that is retrieved ("fetched") from either system memory or a different cache memory, as illustrated by block 220. Then, writing the cache line of the write request to a way that allows for storage of dirty lines, as illustrated by block 222.

Therefore, the claimed subject matter depicts a cache memory supporting an agent's low power mode of operation for a write request by reducing power consumption because the ways that do not store dirty lines may be powered down without a flush operation and regardless of the duration of the low power mode of operation. Furthermore, the claimed subject matter depicts improving cache memory performance because a flush operation is performed only on the ways that are designated to store dirty lines. In contrast, the prior art cache memory performs a flush operation on all the ways.

The selection of the ways to allow for storage of dirty lines was determined by block 202. The selection of the predetermined ways may be performed by a series of external pins. For example, in one embodiment, a decoded value of three external pins for an eight-way cache determines the number of ways that may store dirty lines. Therefore, a value of "001" allows for one way (way 0) to store dirty lines; a value of "002" (ways 0 and 1) allows for two ways to store dirty lines; etc. Alternatively, a basic input and output system (BIOS) firmware may determine the number of ways that are allowed to store dirty lines.

The number of ways that are allowed to store dirty lines may allow for dynamic changes. For example, the cache may initially allow for only two ways, way 0 and way 1, to store dirty lines. Subsequently, the number of ways that are allowed to store dirty lines may be increased to support the storage of more dirty lines. Alternatively, the number of ways that are allowed to store dirty lines may be reduced. For example, a way 0 and way 1 were initially allowed to store dirty lines. Subsequently, the number of ways to support storage of dirty lines needs to be reduced and way 0 is prevented from storing dirty lines. Thus, a flush operation is performed on way 0 to insure synchronization between main memory and way 0.

The claimed subject matter depicted in the method has optional blocks. For example, blocks 210, 212, and 218 depicted one example that is utilized by a hardware coherent system. In contrast, an alternative embodiment does not include the exclusive ownership commands that are depicted in blocks 210, 212, and 218, as utilized by a write-back cache.

Figure 3:
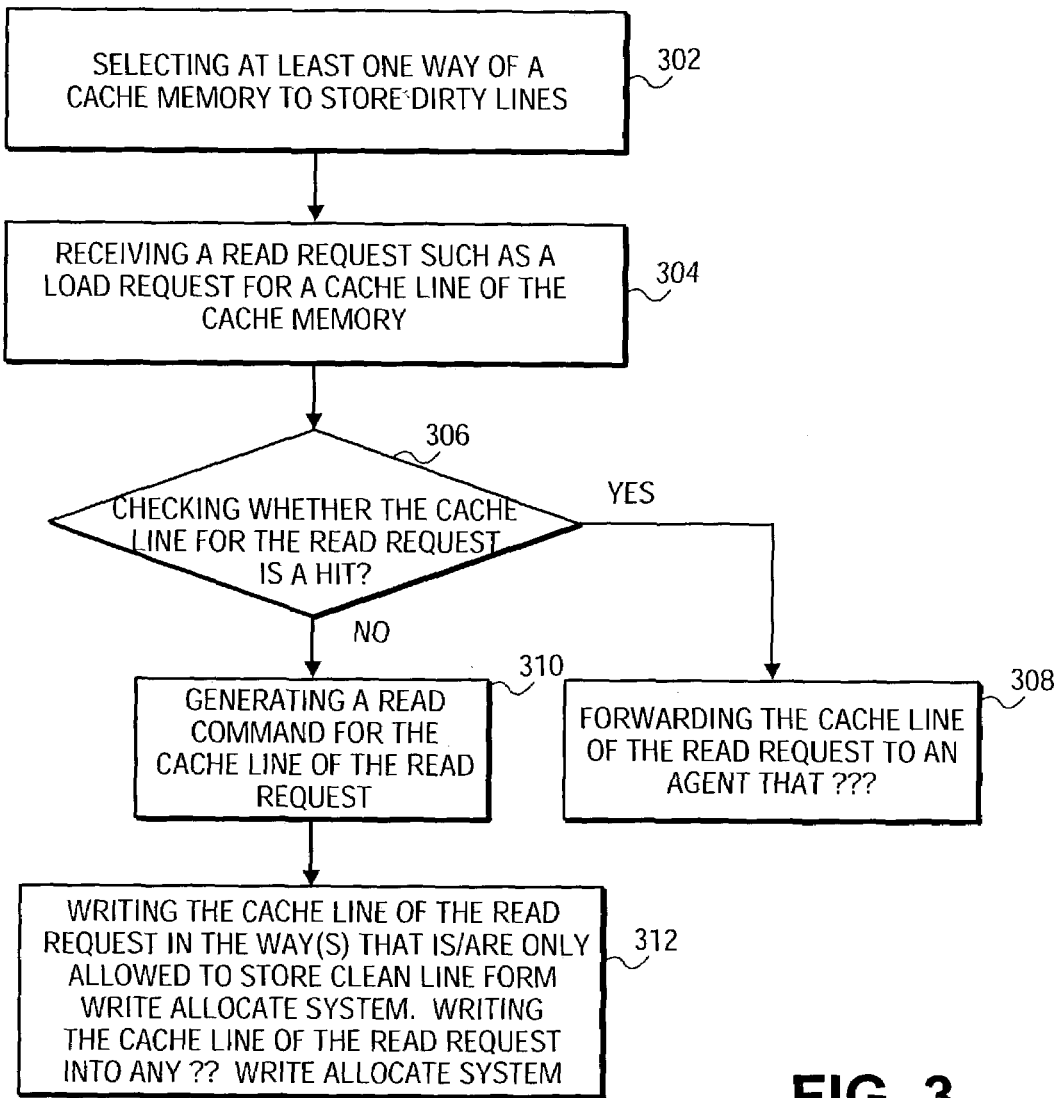
FIG. 3 is a flowchart illustrating an embodiment of a method in accordance with the claimed subject matter.

FIG. 3 is a flowchart illustrating an embodiment of a method in accordance with the claimed subject matter. The flowchart comprises, but is not limited to, a plurality of diamonds and blocks 302, 304, 306, 308, 310, and 312. In one embodiment, the claimed subject matter depicts facilitating a cache memory to support a processor's low power mode of operation by storing dirty lines in predetermined ways. In another aspect, the claimed subject matter allows for powering down of the ways that do not store dirty lines to support a processor's low power mode of operation. In yet another aspect, the claimed subject matter supports a read request from a processor to allow storage of dirty lines in predetermined ways.

In one embodiment, the claimed subject matter selects at least one way of a cache memory to store dirty lines, as illustrated by the block 302. The cache memory receives a read request, such as, a store request for a cache line of the cache memory, as illustrated by the block 304.

Subsequently, a decision to determine whether the cache line of the read request is present in the cache memory and is in a valid state, commonly referred to as a hit condition, is executed by the diamond 306. If so, the cache memory forwards the cache line of the read request to an agent, such as, a processor, as illustrated by block 308. However, the generation of a read command on a bus to obtain the cache line of the initial read request from another cache memory or main memory, applies otherwise, as illustrated by block 310. Subsequently, upon reception of the cache line from the read command, the operation of writing the cache line of the read command to a way that allows for storage of clean lines for a write allocate system, as illustrated by block 312. In contrast, a non-write allocate system allows for writing the cache line of the read command to any way. For example, a non-write allocate system may allow any way to store the fetched data from a read miss to preclude incurring the penalty of reading the data out of a way that only allows for clean lines and writing into a way that allows for dirty lines since the first store operation will never have a hit in a way that allows storage of dirty lines.

The selection of the way for this read request may be performed by any typical cache replacement policy, such as, random, least recently used (LRU), pseudo-LRU, not recently used (NRU), and round-robin protocols.

Therefore, the claimed subject matter depicts a cache memory supporting an agent's low power mode of operation for a read request by reducing power consumption because the ways that do not store dirty lines may be powered down without a flush operation and regardless of the duration of the low power mode of operation. Furthermore, the claimed subject matter depicts improving cache memory performance because a flush operation is performed only on the ways that are designated to store dirty lines. In contrast, the prior art cache memory performs a flush operation on all the ways.

Figure 4:
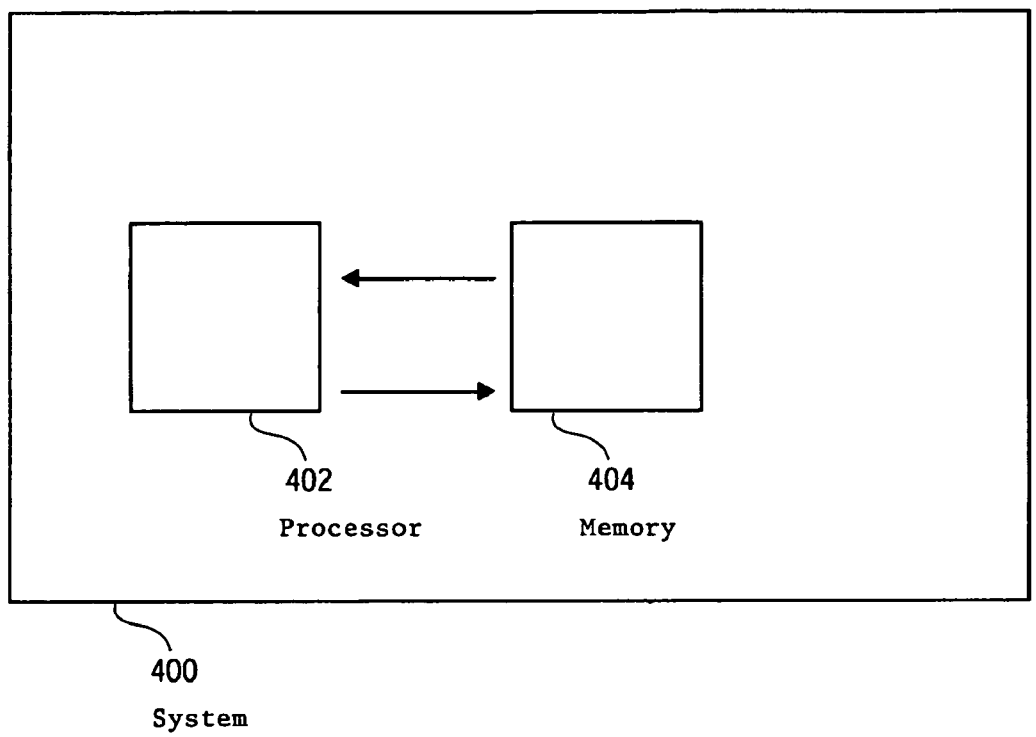
FIG. 4 is a block diagram illustrating a system that may employ the embodiment of either FIG. 1, 2, or 3, or all of them.

FIG. 4 is a block diagram illustrating a system that may employ the embodiment of either FIG. 1, 2, 3, or all. In one embodiment, the system 400 is a computer or a computing system, such as, a personal digital assistant, Internet table, and a communication device. The system comprises, but is not limited to, a processor 402 and a memory 404. The processor may execute instructions and request data from the memory, such as, a cache memory. For example, the processor may generate read requests, such as a load request, for a particular cache line of the cache memory 404. Likewise, the processor may generate write requests, such as a store request, to a particular cache line of the cache memory 404.

In one embodiment, the system incorporates the schematic discussed in connection with FIG. 1. In another embodiment, the system incorporates the methods discussed in connection with either FIGS. 2 and 3, or both. In still another embodiment, the system incorporates the schematic and methods depicted in connection with FIGS. 1, 2, and 3.

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. A method for storing at least one dirty cache line comprising:
    selecting at least a first way of a cache memory to allow for storing the dirty cache line, wherein the selection is based, at least in part, on a power state corresponding to the first way of the cache memory; and
    preventing a second way of the cache memory from storing the dirty cache line, wherein the prevention is based, at least in part, on a power state corresponding to the second way of the cache memory.

2. The method of claim 1 further comprising: allowing the second way to store at least one clean cache line.

3. The method of claim 1 wherein storing the dirty line is based at least in part on a cache replacement protocol.

4. The method of claim 1 wherein storing the clean cache line is based at least in part on a cache replacement protocol.

5. A system comprising:
    a processor to generate a request for a cache line of a cache memory; and
    the cache memory with a plurality of m ways, coupled to the processor, to receive the request and the cache memory to allow n ways of the plurality of ways to store at least one dirty line, wherein n is less than m, and to prevent the storage of dirty lines in the remaining (m-n) ways of the plurality of ways, further wherein the n ways are selected based, at least in part, on a power state corresponding to the n ways;
    wherein the cache memory to determine whether there is a hit condition for the cache line of the request, if so to forward the cache line to the processor for the request if the request is a read request; and to determine whether the cache line of the request is stored in one of the n ways for a write request, if so, to update the cache line within the cache memory.

6. The system of claim 5 wherein the plurality of ways is eight.

7. The processor of claim 5 wherein cache memory is an eight way set associate cache.

* * * * *